Aug. 8, 1939.     A. WHITWELL     2,168,637
OPTICAL INSTRUMENT
Filed May 19, 1937     2 Sheets-Sheet 1

Inventor
ARTHUR WHITWELL,

Attorney

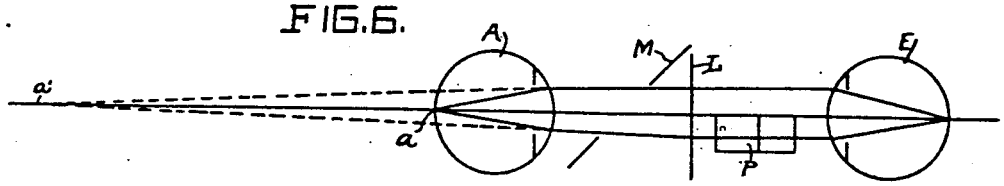
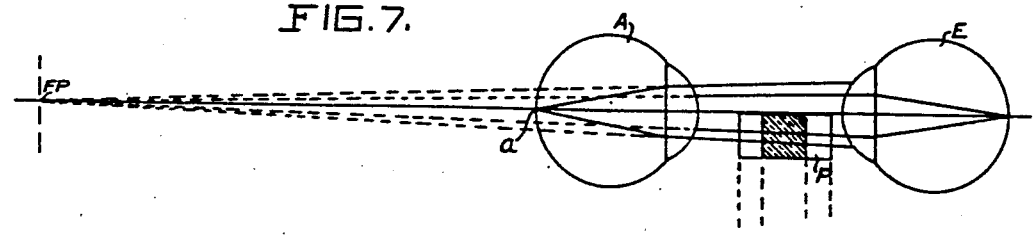
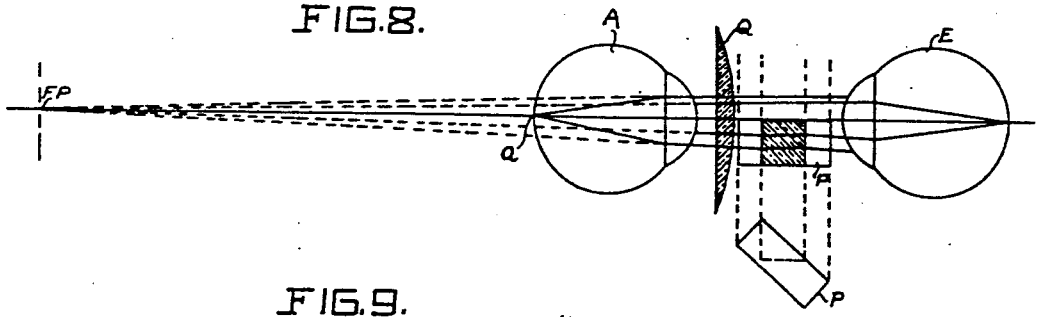
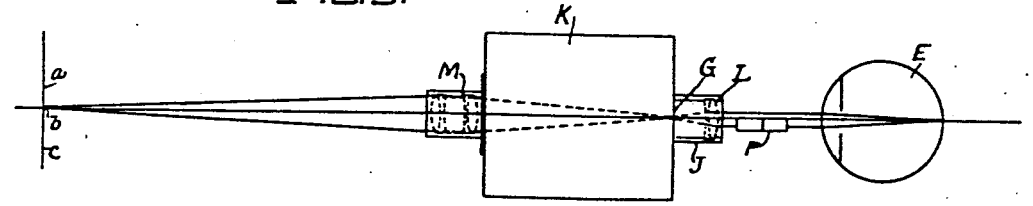
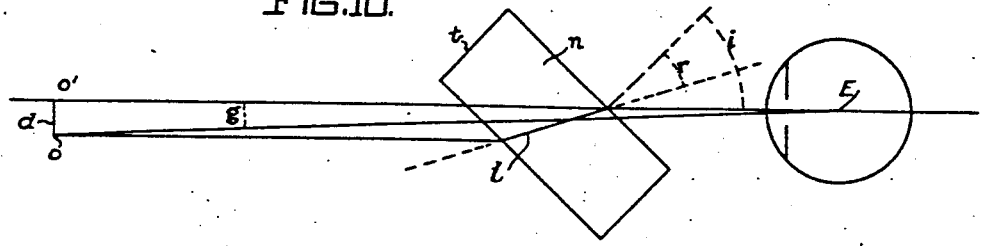

Patented Aug. 8, 1939

2,168,637

UNITED STATES PATENT OFFICE 2,168,637

OPTICAL INSTRUMENT

Arthur Whitwell, London, England, assignor to The Emerson Optical & Mfg. Co. Ltd., London, England Application May 19, 1937, Serial No. 143,601
In Great Britain May 29, 1936

1 Claim. (Cl. 88—1)

This invention relates to optical instruments and particularly to means and methods of focusing optical instruments.

One object of this invention is to provide a method of focusing optical instruments, utilizing an oblique, thick, parallel plate in combination with a lens or optical system to produce an image which is divided into a plurality of parts which are displaced relatively to one another, as well as blurred, when the instrument is not in focus. When the instrument is in focus, however, these parts of the field coincide and also become sharply defined.

Another object is to provide a focusing optical instrument having in combination therewith a thick, oblique, parallel plate and a lens or optical system arranged to provide a two-part image with its parts relatively displaced and blurred when the instrument is out of focus, but coincident and sharply defined when the instrument is in focus.

Another object is to provide an optical instrument such as a lens power-measuring instrument and ophthalmoscope or a photographic camera having as a part of its optical system a thick, oblique, parallel plate and a lens or lens system adapted to split the image of the instrument into two parts whereby the two parts are relatively displaced and blurred when the instrument is out of focus, but are coincident and sharply defined when the instrument is in focus.

Another object is to provide a method of focusing an optical instrument which consists in dividing the field of view into two parts, passing the rays of one part through an obliquely disposed plane parallel plate and adjusting the instrument until the relatively displaced portions of the field return to coincidence and sharpness.

In the drawings:

Figure 6 is a diagrammatic view showing the application of the instrument to an ophthalmoscope.

Figure 7 is a more detailed view similar to Figure 6, showing the invention as applied to an ophthalmoscope.

Figure 8 is a view similar to Figure 7 but including a supplemental lens.

Figure 9 is a diagrammatic vertical section through a photographic camera, utilizing the optical system of this invention, and Figure 10 is a diagram showing the detailed optical action in a trick, oblique, parallel plate.

General arrangement

Figure 1:
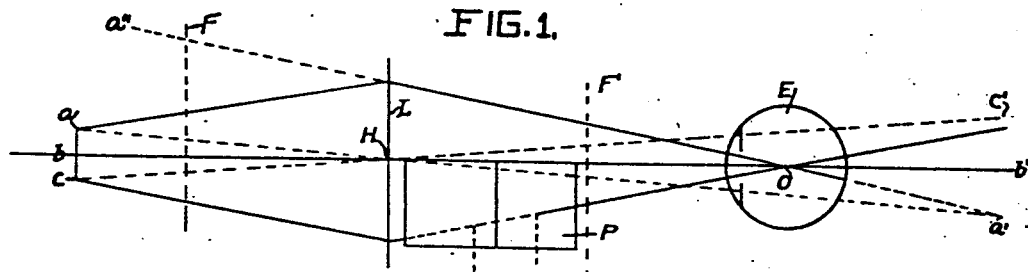
Figure 1 is a diagrammatic side elevation, partly in section, of an optical system showing the optical action of the instrument of this invention.

When an instrument lens such as a camera lens is properly focused, a pencil of rays diverging from an object point will, after refraction by the lens, converge substantially to a corresponding image point in the focal plane thereof. When the lens is not properly focused, however, the rays will not converge to a point but will intersect the plate in a small confusion circle so that the image will be blurred.

In the process of focusing, therefore, one alters the relative positions of the lens and plate till the image becomes sharp. It is difficult properly to compare two views or images when seen one after the other because one has to rely on memory. It is much easier to compare two things when they are visible at the same time in the same field of view. It is also much easier and more accurate to detect changes in displacement of images than changes in the sharpness of definition of images.

In the method and arrangement of focusing of the present invention, the view is divided into two parts, both of which can be seen simultaneously. When the image is not in focus the two parts of the field both appear blurred and in addition one of parts is displaced relatively to the other. Consequently, as both parts are seen at the same time, a good comparison can be made.

When both parts of the field are properly focused, both parts become sharp and, what is more important, the displacement vanishes.

In carrying out the present invention, certain properties of a thick, parallel plate of glass are utilized. Assume, for example, the two parallel sides or faces of the plate to be vertical and the parallel top and bottom edges to be horizontal. The plate is then so arranged that the eye can look over the top edge and see the top half of the object directly whilst the bottom half of the object can be seen only through the plate. The top edge of the plate thus "splits" the field of view and also the pupil of the observer's eye.

In a parallel sided glass plate, parallel rays of light incident on one face remain parallel when they emerge from the other face.

It follows that if one looks at an infinitely distant object over and through a parallel plate, as described above, the two halves of the field of view will appear to be identical in quality and there will be no displacement of the two halves.

When the object is near, however, the result is very different, for the part of the field of view seen directly over the top of the plate will not be identical in quality with the part seen through the plate.

It is true that any particular incident ray from any particular point of the object is parallel to the corresponding emergent ray but a pencil of rays diverging from a point of the object will not, after passing through the plate, appear to be diverging from a single point. If the object seen by direct vision is in focus, therefore, the object seen through the plate will not be in focus.

The parallel plate introduces aberrations when the object is near but not when the object is infinitely distant.

The two parts of the field of view will not be of the same quality and, in addition, if the plate is oblique to the line of vision there will be a relative displacement of the two parts of the field.

Optical action

Figure 2:
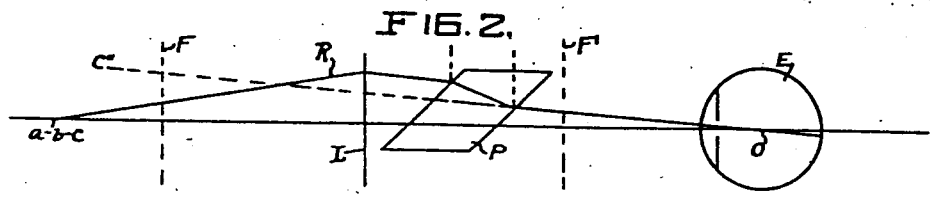
Figure 2 is a diagrammatic plan view of the system shown in Figure 1.

Referring to the drawings in detail, Figure 1 shows in elevation and Figure 2 in plan a lens L, a thick parallel plate of glass P, a vertical object line $a$, $b$, $c$, and an observing eye E having its centre of rotation at the point $o$ on the axis of the lens. The parallel sides of the plate may be inclined to the axis of the lens at any angle. The two focal planes of the lens L are represented by dotted lines F, F' which are the intersections of the focal planes by the plane of the paper.

This combination of lens and plate is essential to the method of focusing of this invention and its optical behaviour will now be described.

Referring to the elevation shown in Figure 1, the points $a$, $a'$ are conjugate with respect to the lens L, both points being on the dotted line $a$, $a'$ which passes through the optical centre H of the lens.

For small angles of incidence we may assume that a small pencil of rays diverging from the object point $a$ will, after refraction by the lens, converge substantially to the image point $a'$.

One of the refracted rays will pass through the centre of rotation $o$ of the eye E and this ray may be regarded as the chief or middle ray of a pencil which fills the pupil of the eye. The observer will thus see the point $a$ in the direction $oa''$. This description applies to all the points on the object line between $a$ and $b$.

The observer thus sees the top half of the line in a vertical plane containing the axis of the lens, hereinafter referred to as the "median plane"; it is the central vertical plane of the elevation in Figures 1 to 4.

Now consider the point $c$. In the absence of the plate P the same description would apply and the bottom half of the line would also be seen in the median plane, in coincidence with the top half.

When the plate is present, however, chief rays proceeding from points in the lower half $b$, $c$, of the object line are, in general, deflected sideways as shown in the plan view of Figure 2. For example, a small pencil of rays diverging from $c$ and having its chief ray in the median plane would not pass through the centre of rotation of the eye, after being refracted by the lens L and after being shifted sideways by the plate.

The chief ray of an incident pencil which is to pass through the centre of rotation of the eye after the refraction and the side shift must therefore lie outside the median plane as indicated at R in the plan view of Figure 2. The eye E will thus see the lower half of the vertical object line $a$, $b$, $c$, in the direction $oc''$. The two parts of each ray before and after the shift by the plate must of course be parallel.

Figure 5:
Figure 5 is a view showing the appearance of the image seen by the observer when the instrument is slightly out of focus.

The sideways displacement due to the plate is indicated in Figure 5 which shows what is seen by the observing eye E, at the line of division $d$.

Action with object in the focal plane

Figure 3:
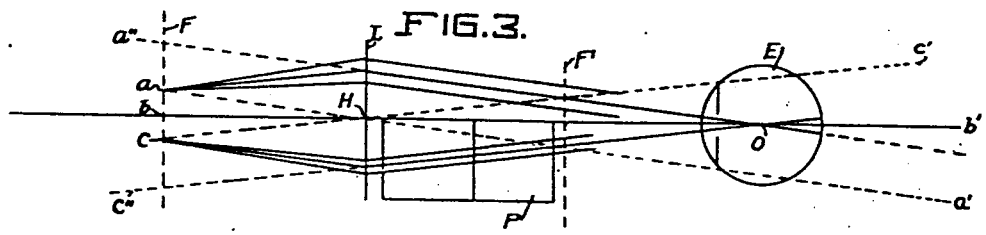
Figure 3 is a diagrammatic side elevation, partly in section, of an optical system similar to that of Figure 1 but with the object placed in the focal plane of the lens.
Figure 4:
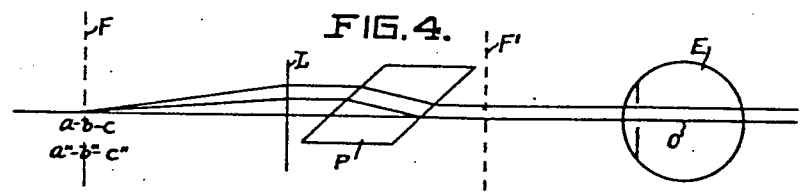
Figure 4 is a plan view of the optical system shown in Figure 3.

Suppose the line object $abc$ to be moved to the right along the axis till it reaches a focal plane of the lens as shown in elevation and plan in Figures 3 and 4. The effect of this is to convert pencils diverging from points on the object into parallel pencils. If the eye E is emmetropic the top half of the line will then be sharply focused on the retina and will appear in the median plane. Similarly the bottom half of the object line will be seen sharply in focus since the pencils from every point on it will be parallel after they emerge from lens and plate.

The important matter, however, is that if the object line is in the median plane the bottom half will also be seen in the median plane, that is to say, in coincidence with the top half. As shown in the plan view of Figure 4 rays diverging from a point $c$ in the lower half of the object will, after refraction by the lens, become a parallel pencil, all the rays of which will be parallel to the median plane. All these rays will remain parallel to the median plane after refraction by the plate and one of them will pass through the centre of rotation of the eye and form the chief ray of a small pencil which fills the pupil of the eye E. The eye thus sees the point $c$ in the median plane. This description applies to all the points between $b$ and $c$.

When a vertical object line which cuts the axis of a lens is moved along the axis towards or away from the lens and is viewed over and through an oblique parallel plate having its refracting faces vertical, the effect is to cause the line seen through the lens and plate to traverse the field of view horizontally from right to left or vice versa until when the object line is in a focal plane of the lens then the line is seen in the median plane in focus with the two parts in coincidence.

It is easy to see that if, in the circumstances postulated above, the object line is horizontal, there will be no visible displacement of the two halves, whether seen through the lens alone or through both lens and plate. In the latter case the displacement due to the plate will be in the direction of the line itself and not across it.

In general, by rotating the object line about the axis in a plane at right angles thereto, the apparent displacement of half the line can be made to vary from a maximum to zero.

In the particular case, when the object line is in a focal plane of a lens having co-axial spherical surfaces, a rotation about the axis will not have this effect since the two halves of the line will always appear to be in coincidence.

Action with astigmatic lenses

As is well known, an astigmatic lens has two powers and two focal lengths in two meridians at right angles called the principal meridians.

Such a lens will in general form an inclined, blurred image of a vertical object line. To focus the lens it is first necessary to rotate it about its axis till the line seen through the lens coincides with the two ends of the line seen directly above and below it.

The angle turned through by the lens (not by the inclined image of the line) is the angle which one of its principal meridians makes with the vertical.

Having thus caused one of the principal meridians of the lens to move into coincidence with the median plane, the focusing is performed exactly as if the lens were spherical.

In the focusing procedure, the oblique parallel plate is inserted as in Figures 1 to 4 inclusive. If the vertical object line is not in a focal plane of the lens the effect will be to cause a displacement of the lower half of the line. A movement of the object line into a focal plane of the lens will cause the displacement to disappear and both halves of the line will be in focus. By rotating the lens through 90 degrees on its axis and by repeating the foregoing operation the other meridian of the lens can then be focused.

The displacement of a vertical line produced by an oblique, parallel plate is always in the direction parallel to the ineffective edges of the plate so that if the refracting faces are vertical the displacement is horizontal. It follows that in the case of the spherical lens shown in Figures 1 to 4 inclusive, the power or focusing is being measured in the horizontal meridian.

If, however, the lens in Figures 1 to 4 inclusive is assumed to be an astigmatic lens with one of its principal meridians vertical focusing would be made, or the power measured, in the horizontal meridian.

The essence of my invention, therefore, consists in using an oblique, parallel plate in combination with a lens or optical system in such a way that, by a coincidence method, it indicates whether an object or image lies in a focal plane of the lens or optical system: in other words it indicates, both by the sharpness of the two parts of the image seen and by the absence of a transverse shift of the two parts of the field of view, when the imaging pencils which traverse it are parallel pencils.

*Lens measuring instrument*

There are certain instruments on the market for measuring the vertex powers or focal powers of spectacle lenses.

These instruments in their operation depend on the focusing of a line, cross or target for indicating when the desired position of the measuring drum or other indicator is reached. They could be made to give more accurate results by using my oblique, parallel plate and coincidence method in the beam of rays, in the manner set forth above.

*Ophthalmoscope*

The invention can be used in the lens system of an ophthalmoscope in the manner indicated in Figures 7 and 8.

When using the ophthalmoscope the inside of the eye is illuminated by reflecting into it a beam of light by means of a 45 degree mirror M (Figure 6) in which is an aperture through which the illuminated fundus or most sensitive portion of the retina can be examined.

If the observed eye be emmetropic, an emmetropic observer will see the fundus sharply in focus. The retina of the observed eye, when its accommodation is completely relaxed, is conjugate with infinity with respect to its optical system so that the image of the retina will be formed at infinity.

If, now, the observer puts in the oblique, parallel plate P so as to "split" his own pupil and the field of view as described above he will still see the fundus sharply in focus and there will be no difference between the two halves seen direct and through the plate.

If, however, the observed eye be ametropic, for example, hyper-opic, the image of the fundus will be formed at the far-point FP behind the retina. The observer, by exerting his accommodation, can still see the image sharply in focus.

When the observer puts the oblique parallel plate P into this optical system (Figure 7), his eye E will no longer see the whole of the fundus of the patient's eye A sharply in focus. The part seen by direct vision over the top edge of the plate will be in focus but the part seen through the plate will appear to be blurred and also displaced. Every small blood vessel or anatomical detail that crosses the dividing line will apparently be shifted sideways. The oblique plate P thus indicates that the image of the fundus *a* formed by the optical system of the observed eye A is not at infinity but has a certain amount of "nearness".

The observer now inserts lenses Q of various powers between the plate P and the observed eye A until he finds a lens Q which will make the two halves of the fundus image appear not only in sharp focus but also in coincidence. The focal plane of the lens Q now coincides with the far-point FP at which the optical system of the ametropic eye A forms an image of its fundus *a*. Rays emerging from the lens Q will then be parallel, hence the oblique plate P will not displace the image. The power of the inserted lens Q then equals the error of the observed eye and is its "distance vision" correction. If, however, the lens Q is not of the proper power, the rays appearing to come from the far-point FP will not be parallel after passing through the lens Q, hence the plate P will cause an image displacement.

The spectacle lens to be worn is mounted at the same distance from the ametropic eye as the lens Q.

*Photographic camera*

Another application of the present invention is to the focusing of camera lenses. Figure 9 shows a diagram of a fitting J on the back of a camera K with a camera lens M. L is the focusing lens and P the oblique plate of the present invention.

The fitting J must be fixed on the back of the camera K accurately and rigidly in such a position that the focal plane of the focusing lens L coincides with the plane G to be occupied by the sensitive film of the photographic plate when it is placed in proper position.

With this arrangement an image of the object to be photographed is formed by the camera lens M at G in the focal plane of the focusing lens L.

Pencils of light from each point of the image in the front focal plane of the focusing lens L after being refracted by the lens will become bundles of parallel rays. Whether these parallel rays pass through the oblique plate or not, they will enter the eye as parallel rays. Consequently there will be no transverse shift of part of the field as would be the case if the camera lens M were not properly focused upon the plane G.

This arrangement in Figure 9 is thus a telescopic optical system in which the camera lens M is the objective and the focusing lens L the eyepiece.

When it is advisable to focus any particular plane of the object to be photographed in the plane of the sensitive film, use may be made of a white thread, wire or similar object suspended in the selected plane. This thread would in general appear to be in two displaced parts when the image is not accurately focused. These parts may be made to coincide by altering the relative positions of the camera lens M and the focal plane of the focusing lens L.

If instead of a white thread a coloured strip is used, it is possible to focus the camera lens M for rays of a definite wave length.

From what has been said it is clear that the thick, oblique, parallel plate in the present invention has the following three important properties:

(I) It does not alter an object or image when either is at infinity.

(II) It divides a near line into two separate displaced parts.

(III) It makes one of these two parts blurred as compared with the other.

An oblique parallel plate cannot of itself tell the observer how far away an object or image is. It is a device of the "scope" class and not of the "meter" class, but it indicates "nearness" of an object point just as a gold leaf electroscope indicates the presence of a charge of electricity.

The present invention provides the thick, oblique, parallel plate combined with a lens of known power or focal length in the manner set forth above, thereby providing an instrument of the quantitative or meter type having measuring qualities rather than mere indicating qualities.

*Displacement produced by a thick, oblique, parallel plate*

Referring to Figure 10, let $t$ = thickness of the plate, $n$ = index of refraction of its glass, $i$ = angle of inclination of the plate to the axis, $i$ and $r$ = angles of incidence and refraction of a ray parallel with the axis E, the position of the centre of rotation of the observing eye, o, a point on the object near the axis, $u$ = the distance oE in metres, of the object point from the centre of rotation, $d$ = displacement of the point o measured at right angles to the axis, $g$ = the angular displacement of the object point produced by the plate, $l$ = length of the path of a ray in the glass.

Then from Figure 10 we see that (I) $\sin i = n \sin r$ (II) $t = l \cos r$ (III) $d = l \sin(i-r) = t \tan r \ (n \cos r - \cos i)$ (IV) $\sin g = \dfrac{d}{u} = t \tan r \left( \dfrac{n \cos r - \cos i}{u} \right)$ If we take particular values and put $i=45°$; $t=.01$ metres $=1$ cm.; $n=1.523$ we get from Equation III $d = .00336 = 3.36$ mm.

that is to say a point 3.36 mm. from the axis will be seen in the direction Eo' of the axis when examined through the parallel plate but will be seen in the direction Eo when examined directly over the top edge of the plate. The point o will thus appear to be displaced through an angle $g$.

If the object is 1 metre away from the eye the angle $g$ as obtained from Equation IV will be $\sin g = .00336$ or $g = 0°.192 = 0°.11'.31''$ The following table gives a few values of the displacement when the object is at different distances.

| Distance of object | "Nearness" of object | Angular displacement |
|---|---|---|
| 10 metres | Diopters 0.1 | 0°.0192 = 0°. 1'.9'' |
| 5 metres | .2 | 0°.0384 = 0°. 2'.18'' |
| 2.5 metres | .4 | 0°.0768 = 0°. 4'.36'' |
| 1 metre | 1.0 | 0°.192 = 0°. 11'.31'' |
| 0.5 metre | 2.0 | 0°.384 = 0°. 23'.24'' |
| 0.25 metre | 4.0 | 0°.768 = 0°. 46'.4'' |

It is easy to detect an angular displacement of 1 minute of arc by the coincidence method so that one tenth of a diopter of error may be easily measured.

It will be understood that I desire to comprehend within my invention such modifications as may be necessary to adapt it to varying conditions and uses.

It will be further understood that the manner in which this device works will be quite clear to any designer of optical instruments and he would have no difficulty in applying it to the numerous instruments which depend upon the act of focusing for their adjustment and use. The camera, ophthalmoscope and lens measuring instrument mentioned above are but three examples of applications of this invention.

Having thus fully described my invention, what I claim as new and desire to secure by Letters Patent, is:

An optical viewing instrument for determining the accuracy of focus of a given lens system with respect to a desired predetermined focus, said instrument comprising a second lens system arranged coaxially to said given lens system and with one of its foci coincident with said predetermined focus so as to refocus the rays emerging from said given lens system at infinity, and a relatively thick plane parallel plate mounted with its parallel refracting surfaces disposed obliquely to the axis of said lens systems and positioned but partially across the path of the rays therefrom and with one of its bounding edges arranged to divide the emergent rays therefrom into two parts, whereby the image portions observed beyond said plate are coincident in position and sharp in definition when said given lens system is properly focussed upon said predetermined focus but relatively displaced and blurred when said given lens system is focussed elsewhere than at said predetermined focus.

ARTHUR WHITWELL.